June 9, 1964

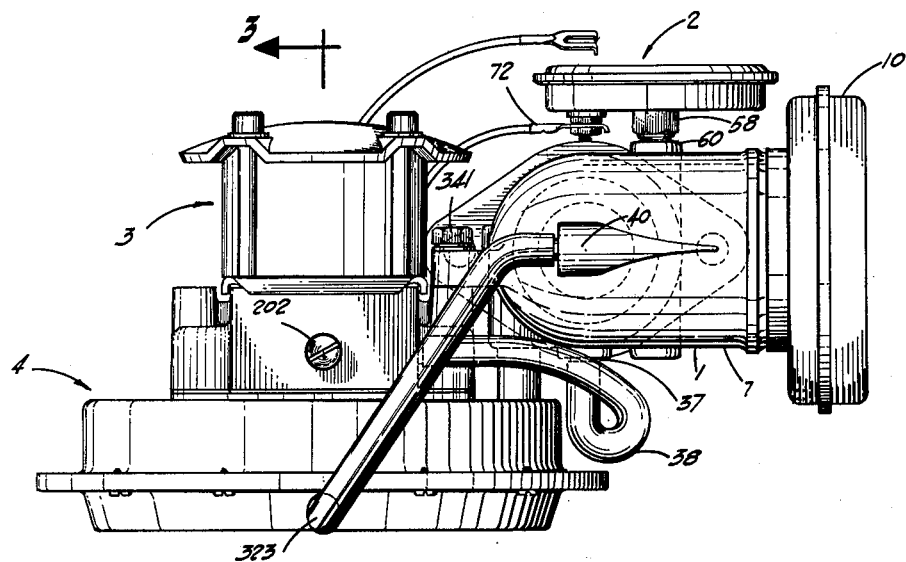

D. B. BICKLER ETAL 3,136,613

GAS CARBURETING APPARATUS

Filed April 6, 1959

INVENTORS
Donald B. Bickler
Arthur C. Allen
Paul C. Hosking

By John C. Black
Attorney

June 9, 1964  D. B. BICKLER ETAL  3,136,613
GAS CARBURETING APPARATUS
Filed April 6, 1959  6 Sheets-Sheet 3

INVENTORS
DONALD B. BICKLER.
ARTHUR C. ALLEN.
PAUL C. HOSKING.

BY John C. Black
ATTORNEY

June 9, 1964 D. B. BICKLER ETAL 3,136,613
GAS CARBURETING APPARATUS

Filed April 6, 1959 6 Sheets-Sheet 4

INVENTORS
DONALD B. BICKLER
ARTHUR C. ALLEN
PAUL C. HOSKING

By John C. Black
ATTORNEY

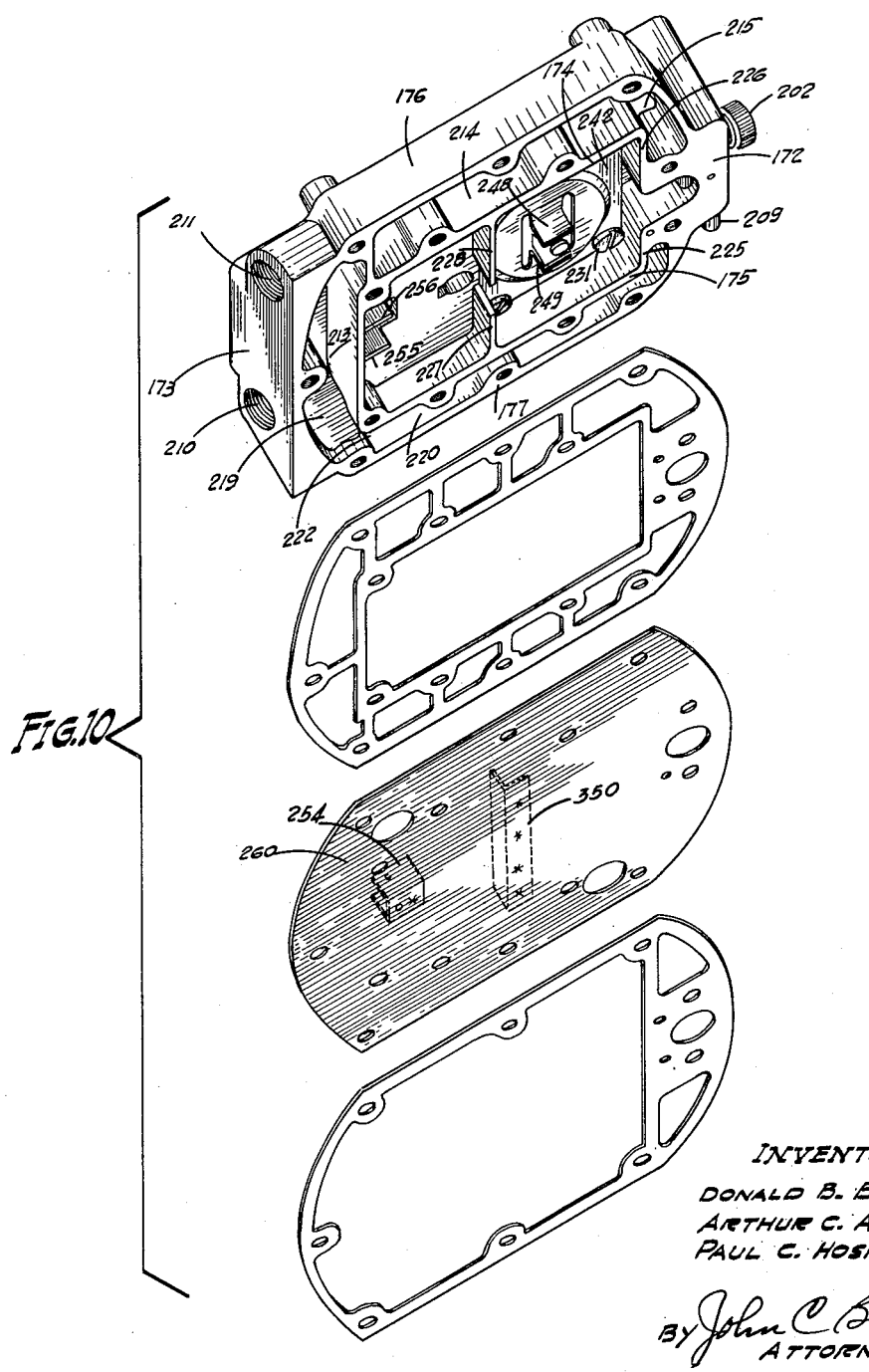

June 9, 1964  D. B. BICKLER ETAL  3,136,613
GAS CARBURETING APPARATUS
Filed April 6, 1959  6 Sheets-Sheet 6

INVENTORS.
Donald B. Bickler
Arthur C. Allen
Paul C. Hosking

By John C Black
Attorney

United States Patent Office

3,136,613
Patented June 9, 1964

3,136,613
GAS CARBURETING APPARATUS
Donald B. Bickler and Arthur C. Allen, Chicago, and Paul C. Hosking, Wilmette, Ill., assignors to Stewart-Warner Corporation, Chicago, Ill., a corporation of Virginia
Filed Apr. 6, 1959, Ser. No. 804,266
6 Claims. (Cl. 48—184)

This invention relates to combustion engine carburetion systems for petroleum fuels of the type which assume a gaseous form at atmospheric temperature and pressure and which are normally stored in liquid form under high pressures.

The carburetion apparatus embodying the features of the present invention has been particularly adapted for carbureting propane; however, it will be appreciated that, with minor modification, it can carburet other similar fuels such as butane. For ease of description, it will be assumed that propane is used. Also, the terms "super-atmospheric pressure" and "subatmospheric pressure" will denote fluid pressures which are respectively above and below atmospheric pressure.

The propane is stored in a reservoir or tank in liquid form at a very high pressure. When the engine is running, the liquefied propane is usually reduced to an intermediate pressure, for example 3 p.s.i. gage, by a primary pressure regulator. The propane begins to vaporize at this intermediate pressure and its temperature drops from room temperature to temperatures in the order of minus 30° Fahrenheit. The vaporized propane at the intermediate pressure is then further reduced to a predetermined subatmospheric pressure by a secondary pressure regulator.

Heat from an external source, for example the water cooling system of the combustion engine, is supplied to the propane in the primary and/or secondary regulator in order to assure its complete vaporization and to raise its temperature above that of the atmosphere.

In the typical propane carburetion system, combustion air is conveyed through a carburetor passageway from the atmosphere to the combustion engine manifold which is at a subatmospheric pressure. A manually operated butterfly valve is normally introduced into the air passageway for the purpose of controlling the rate of flow of air from the atmosphere to the engine manifold. At a desired position in this passageway, a venturi structure is provided for producing at its throat a subatmospheric pressure. This throat pressure decreases as the air velocity therethrough increases. The purpose of the subatmospheric pressure at the venturi throat is to provide a pressure differential for causing the flow of the gasified propane from the secondary regulator to the carburetor passageway for admixture with the combustion air to form a combustible fuel mixture.

It is the primary obpect of the present invention to provide a unitary carburetor, fuel pressure regulator, heat exchanger, and start-stop valve construction which is unusually low in cost and which has been especially adapted for best utilizing mass production techniques, yet which displays operating characteristics far superior to those of similar commercially available devices. Although there may be some suggestion of a unitary structure of this type in the prior art, no such construction has ever been successfully produced commercially as far as is known. For optimum operation, a device of this sort depends upon the critical interaction of the numerous operating components, their supporting and housing structures, and the various fluid conducting chambers. It is not possible to merely aggregate a plurality of diagrammatically disclosed components, or for that matter individually designed component constructions, to achieve a unitary propane regulating and carbureting device which will provide optimum operation at peak efficiency.

The fuel consumption of the combustion engine will vary as a function of the engine output power. As the engine output power increases from its lowest condition at idling, the mass flow of combustion air is increased as a direct function of the power. As the mass flow rate of air increases, it is desirable to increase the mass flow rate of propane from the secondary regulator to the carburetor passageway as a function of the mass flow of air to at least maintain the mass ratio of fuel to air. In fact for optimum engine operation, it has been found to be preferable to increase the mass ratio of fuel to air progressively as a function of the output power of the engine. Therefore, it is desirable to increase the mass flow of fuel at a higher rate than the increase in mass flow of air as the output power of the engine increases. For ease of description, this will be referred to as lean and rich fuel-air mixtures.

However, all of the known commercial propane carburetion systems have the disadvantage that the secondary regulator introduces a small error which becomes progressively worse as the fuel flow rates increase. Unfortunately, the error introduced acts in such a way as to cause the fuel-air mixtures to become progressively leaner at higher output power conditions of the engine when optimum engine operation requires that the mixtures be richer. As far as is known, no satisfactory solution to this problem has been achieved prior to this invention. Several very complex and costly mixture controlling devices have been incorporated into the commercial propane carbureting systems to partially alleviate this condition so that the systems are at least commercially acceptable.

One significant reason for the lean mixtures in commercial apparatus at high engine output power lies in the construction of the secondary regulator. This regulator includes an inlet valve port, a valve check for controlling the flow of fuel through the port, a spring for biasing the valve check toward its closed position over the port, and a diaphragm for controlling the movement of the check to maintain a selected regulator output pressure.

The valve check feels the primary regulator pressure on one side and the secondary regulator pressure on the other side. Therefore, it is desirable to make the effective cross-sectional areas of the valve check and of the valve seat at the valve check end of the valve port as small as possible to minimize the force differential on the valve check. However, we are limited in this respect because, at least at maximum engine output power, the valve must not be a restriction unduly limiting the fuel flow. The effective areas of the valve check and seat must be sufficiently enlarged even though a greater force of unbalance on the valve must be overcome by the diaphragm.

Hence, the biasing spring is provided with a sufficient amount of force to reliably maintain the valve closed against the unbalanced fluid forces acting on the valve check. This spring force must equal the sum of the fluid unbalancing force on the valve check as well as a small seating force.

The spring is progressively compressed as the valve opens progressively for higher fuel flow at higher engine output power. As a result, the spring force varies as a function of valve position and causes an increasing force to be applied to the diaphragm as the rate of fuel flow increases. This increasing force on the diaphragm will urge the valve check toward its closed position. Consequently, the fuel flow through the valve port is more restricted than it would otherwise be were it not for the change in spring force; and the output pressure of the regulator decreases.

As the fuel requirements of the engine increase with higher engine output power, the mass flow of air increases as a direct function of the power. The subatmospheric pressure in the throat of the carburetor venturi decreases to call for more fuel. However, the output pressure of the secondary regulator also decreases, although not as much as the throat pressure. A portion of the required fuel increase is lost and the mixture is leaner. As a result, manufacturers have resorted to the use of additional apparatus in their propane carbureting devices to alleviate this condition.

In addition, they rely upon secondary regulators with little sensitivity and with output pressures substantially below atmospheric pressure. These regulators cannot supply sufficient fuel at lower air flows unless an unduly restricted venturi is used to obtain a sufficient pressure differential between venturi throat and the regulator. This gives rise to a dilemma. If a small venturi is used, the carbureting device can be used only with engines developing more limited output powers. Alternatively, if a large venturi is used, little or no fuel will flow from the secondary regulator at low air flows, at idle and low power output because the regulator pressure will be substantially equal to or greater than the venturi throat pressure. Hence, present commercial apparatus has depended upon special means in addition to the secondary regulator for supplying fuel so that a large venturi can be used.

Accordingly, it is an object of the present invention to provide apparatus of the type described in which fuel pressure regulator means are provided which compensate for or eliminate the tendency of the apparatus to supply a progressively leaner fuel-air mixture as the output power of the engine increases. A related object of the present invention is the provision of a low cost, simplified, yet very sensitive secondary regulator which will reliably maintain the fuel output pressure at a value insignificantly below that of the atmosphere. This is made possible by an improved valve, biasing spring, pivoted lever, and diaphragm design. The diaphragm stroke is short. The valve movement is minimized by connecting it to the lever at a position closer to the pivot of the lever than the diaphragm connection. The effective valve area is made sufficiently large to permit adequate fuel flow with only short valve check movement. The spring is interposed between the pivot and the diaphragm connection on the side of the lever opposite the valve check and engages the lever at a position substantially closer to the pivot than the valve check connection. Thus the variation in spring compression is unusually small even for maximum variation in diaphragm position, and the regulator output pressure variation is held to an insignificant value. By maintaining the secondary regulator pressure constantly at a value almost insignificatly below atmospheric pressure, the richness of the fuel-air mixture will not be appreciably affected.

It is a further object of the present invention to provide, in apparatus of the type described, a very sensitive fuel pressure regulator with an output pressure close to atmospheric pressure to permit the use of a carburetor venturi of substantial cross-section without unduly restricting fuel flow produced by the subatmospheric venturi throat pressure.

One exception to the above-described optimum fuel-air mixture variations for optimum engine efficiency exists when the engine is idling. The low pressures in the engine cylinders and the high exhaust pressure cause pollution of the combustible mixture when the engine is idling. Therefore, in order to avoid stalling of the engine, a rich mixture is required. All known commercial devices to date have included a complex and costly means for supplying fuel when the engine is idling and/or have sacrificed optimum operational characteristics at engine operating conditions other than idle to permit an adequately enriched mixture at idle. In all or most of this equipment, the adjustments are critical and are unreliable over a long period of time.

Accordingly, it is an object of the present invention to provide an improved method and means for enriching the fuel mixture at idle to assure optimum engine operation. This is accomplished by the provision of a very sensitive secondary regulator for regulating the fuel at a pressure insignificantly below atmospheric pressure together with a restricted fluid connection between the primary regulator chamber and the carburetor passageway. This restricted interconnection between a source of superatmospheric pressure propane and the carburetor passageway results in an unusually simplified regulator construction and in more reliable operation.

Another but very important reason for the lean mixtures of present commercial devices at high engine output powers lies in the design of the fuel heating means. In present commercial propane carburetion systems, the propane is heated to high temperatures as high as 180° Fahrenheit prior to its admixture with combustion air. This high fuel temperature is known to be desirable for combustion of the fuel mixture and for preventing ice formation on the carburetion apparatus. It has been found that this high fuel temperature is satisfactory or even preferable at idling and low engine power output conditions. However, it has been found to be undesirable at high engine power output.

In addition to minimizing the tendency of the carburetion system to provide leaner mixtures at higher engine output powers by the use of an improved regulator construction, the applicants have discovered a simplified mode of operation which assures richer mixtures at higher power outputs. The experts have overlooked the approach of increasing mixture richness as a function of power by the simple expedient of increasing the fuel density as a function of power.

The applicants hit upon the idea of providing a heat exchange means which is adequate to raise the propane to a high temperature at idle and which is capable of heating the propane only to progressively lower temperatures as the power output of the engine increases. This is accomplished by making use of the progressively increasing flow rate of the propane through the primary regulator.

The primary regulator includes a chamber for storing propane at the intermediate pressure, 3 p.s.i. gage; and its passageway for conducting the vaporized propane from the primary regulator valve to the secondary regulator valve is maintained substantially unrestricted for adequate fuel flow at higher engine power conditions. However, an appreciable portion of the propane in the chamber remains in liquid form at a very low temperature due to the heat required for propane vaporization. Therefore, sufficient baffling of this chamber is provided to prevent the splashing of liquid propane into the secondary regulator chamber and to assure sufficient heat exchange surface for vaporization of the propane entering the secondary regulator valve.

With the above objectives in mind, the primary regulator chamber and its associated heat exchange apparatus have been designed such that the vaporized fuel entering the secondary regulator chamber will be highly superheated, for example as high as 180° Fahrenheit, at idle engine conditions; whereas at higher engine power conditions, the fuel flow in relation to the capacity of the heat exchanger is so rapid that only vaporization of the fuel is assured. At full engine power requirements, only vaporization and little or no super-heating is provided. This has been found to result in the highly advantageous and unique operational feature of providing a leaner fuel mixture at low speeds while providing a progressively richer fuel at intermediate and higher speed and power requirements. This follows because the fuel density increases as the temperature decreases. This has been found to result in optimum efficiency of engine operation throughout most or all of the widely varying engine operating conditions. The rich idle mixture is provided by other means.

Accordingly, it is a primary object of the present invention to provide in a gas carbureting system a method and means for progressively increasing the richness of the fuel-air mixture as the power output of the engine increases by varying the fuel density.

It is a related object to provide in engine gas carbureting equipment heat exchange means for supplying fuel at a progressively higher density as the engine power output increases, thereby to progressively increase the fuel richness as a function of engine output power.

It is a further object to provide an improved means for starting and stopping the flow of fuel to the regulator. This improved means assures instantaneous stopping of the fuel flow and also obviates the requirement of the special priming means commonly found on commercial apparatus.

Finally, it is an important object to provide a unitary carburetor, fuel pressure regulator, heat exchanger, and start-stop valve which is economical and compact, and which includes all of the improvements set forth above.

Other objects and the numerous features of the invention will be appreciated upon a perusal of the following description taken in conjunction with the accompanying drawings in which:

FIG. 1 is an elevation view of applicants' improved fuel carbureting apparatus;

FIG. 2 is a plan view partially in section of the apparatus;

FIG. 10 is an exploded perspective view of certain of the components which define the water and fuel passageways in the heat exchanger and the regulator assembly;

Figure 3:
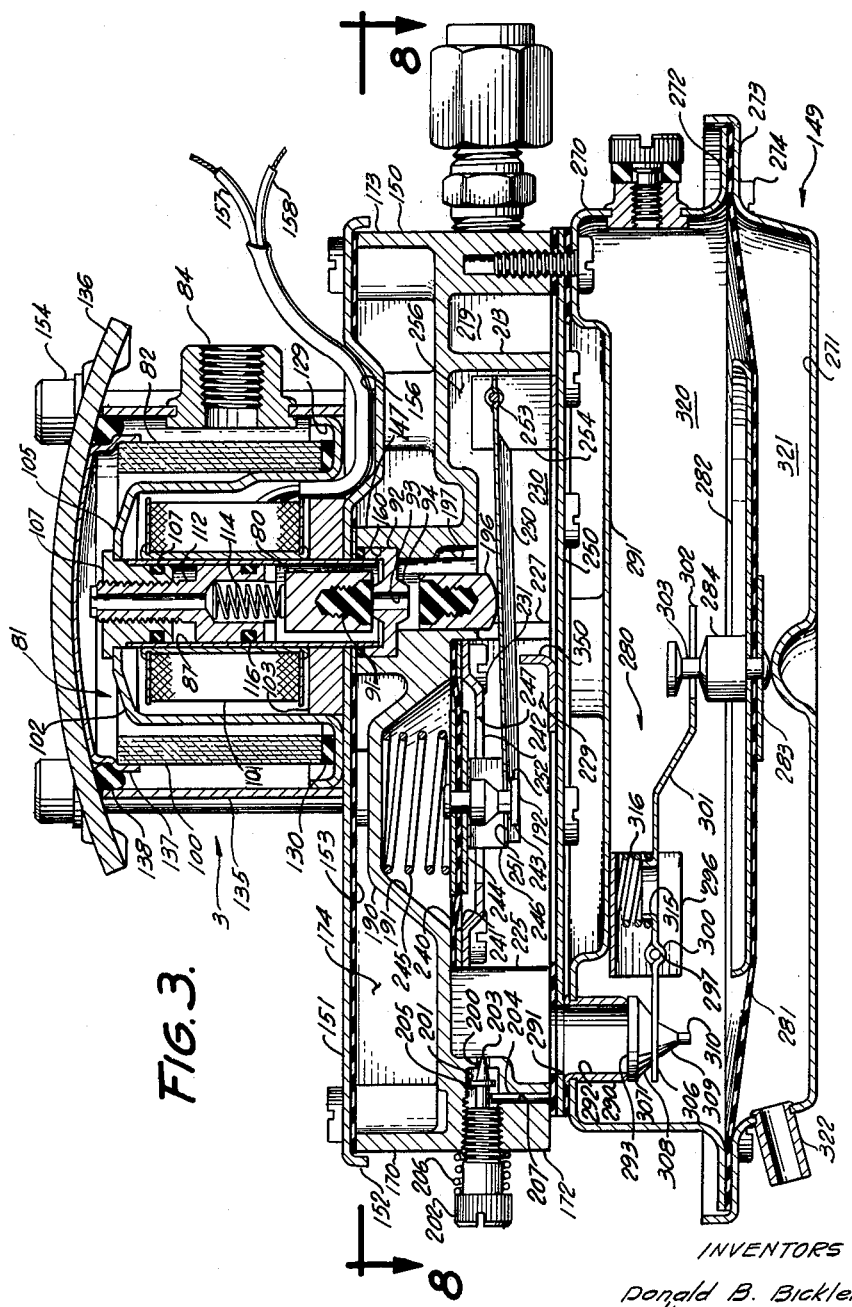
FIG. 3 is a sectional elevation view of the fuel regulator assembly and its associated heat exchanger along line 3—3 of FIG. 1.

Briefly, the improved apparatus of the present invention comprises a carburetor 1 (FIG. 1), a vacuum switch 2, a fuel on-off valve assembly 3 and a combination heat exchanger-regulator assembly 4.

The carburetor 1 preferably comprises a generally L-shaped tubular body 7 (FIG. 2) of cast iron. The body 7 includes a flange 8 adjacent the air intake end 9 thereof, which flange and end support a suitable air cleaner 10. The opposite end of the body 7 includes an enlarged flange 13 with spaced bores 14 for suitable connection with the manifold of a combustion engine (not shown).

Figure 5:
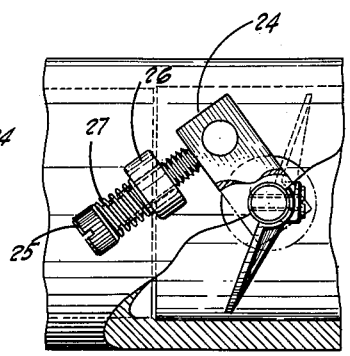
FIG. 5 is a partial elevation view showing certain details of the carburetor butterfly valve assembly.

A butterfly valve assembly 15 is secured in bosses 16 and 17 on the carburetor body 7. The butterfly valve assembly 15 includes a pair of bushings 18 and 19 which are pressed into the bosses 16 and 17. A valve arm 20 is rotatably carried in bushings 18 and 19. A suitable butterfly valve disk 21 is rigidly secured to the arm 20 and is rotatable in the passageway 22 defined by the body 7. The disk 21 provides a variable restriction in the passageway in a well known manner to control the flow of fuel and air to the engine. The arm 20 and the disk 21 are held in place in the body 7 by means of a spring washer and E-ring assembly 23 and a manually operable accelerator or throttle arm 24 (FIG. 5). An adjusting screw 25 is threaded into a projection 26 on the body 7 to engage the arm 24. The screw 25 adjusts the position of the butterfly valve assembly 15 for the idle condition of the engine. A spring 27 retains the screw 25 in its adjusted position.

A nozzle 30 and a venturi 31 are secured in a fixed position in the passageway 22 intermediate the air intake end 9 and the butterfly valve disk 21. The nozzle 30 is an annular truncated conical element. The venturi 31 is an annular element, the sides of which are curved inwardly in the direction of the butterfly valve assembly 15. The intersection of the juxtaposed ends of the nozzle and venturi define a venturi throat with a generally annular peripheral aperture 32. The aperture 32 is broken preferably at three arcuately spaced positions at which positions the venturi 31 provides enlarged sections 33 for receiving the nozzle 30. A fuel metering orifice 35 (FIG. 4) which will be described in more detail subsequently is disposed within the body 7 at a position immediately adjacent the aperture 32. The body 7, the nozzle 30 and the venturi 31 define an irregular generally annular fuel chamber 36 interconnecting the orifice 35 and the aperture 32.

The body 7 carries an idle fuel feed stud 37 downstream of the butterfly valve disk 21. Stud 37 is connected to the regulator apparatus 4 by way of a hose 38. The stud and hose will be described in more detail later.

The body 7 further defines a boss 40 intermediate its air intake end 9 and the venturi 31. The boss 40 defines a bore 41 which is in line with the direction of air flow through the air cleaner 10 and into the passageway 22. A cylindrical stud 42 is pressed into the bore 41. The purpose of the bore 41 and the stud 42 will be explained subsequently during the detailed description of the regulator assembly 4.

Figure 11:
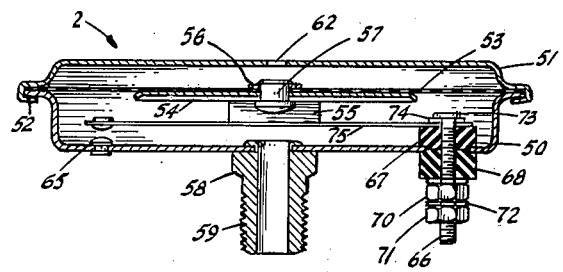
FIG. 11 is a sectional elevation view of the vacuum switch.
Figure 4:
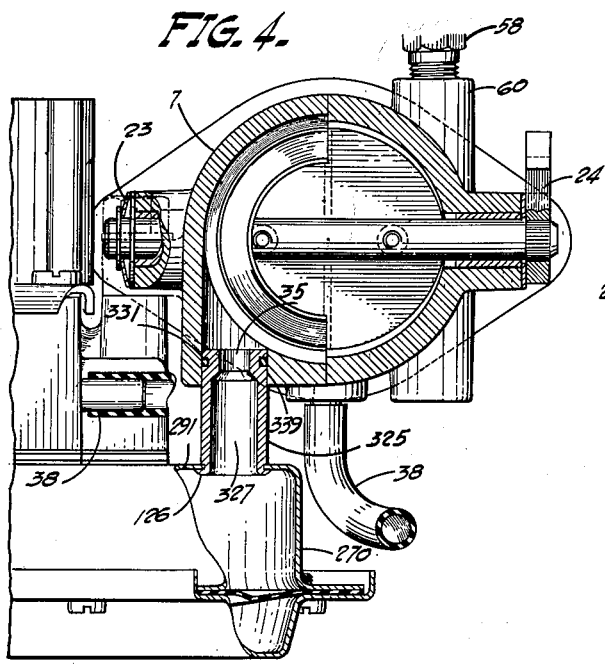
FIG. 4 is a partial sectional elevation view along line 4—4 of FIG. 2 showing the gas metering orifice and its connection to the carburetor venturi throat.

The vacuum switch 2 as best seen in FIG. 11 comprises a generally cup-shaped lower body portion 50 and a generally cup-shaped upper body portion 51, the peripheral edges of which are rolled over a flange 52 on the lower body portion to secure the two together. A disk-like diaphragm 53 is rigidly retained between the flange 52 and the upper body portion 51. The diaphragm 53 carries a rigid plate 54, a U-shaped guide member 55 and a washer 56. A rivet 57 firmly retains the washer, diaphragm, plate, and guide member in fixed position relative to each other. The lower body member 50 is rigidly secured to an adaptor 58. The lower end of the adaptor is threaded at 59 for connection with a cylindrical boss 60 (FIGS. 1 and 4). The boss 60 defines an internal passageway (not shown) connected in fluid conducting relationship with the carburetor passageway 22 downstream of the butterfly valve disk 21 and with a central bore (not shown) in the adaptor 58. Therefore, the lower side (FIG. 11) of the diaphragm 53 is subjected to manifold pressure. The other side of the diaphragm is subjected to atmospheric pressure by way of the central aperture 62 in the upper body portion 51.

The lower case portion 50 supports a rounded contact 65 which is in the form of a rivet secured to the member 50. The member 50 also supports a metallic stud 66 which is insulated from the member 50 by means of an insulating spacer 67 and an insulating washer 68. The stud 66 is threaded at its lower end to receive a pair of nuts 70 and 71 with an electrical terminal 72 held securely therebetween in electrical conducting relationship with the stud. The upper end of the stud 66 is headed at 73 and firmly retains a washer 74 and a leaf spring 75 against the spacer 67. The spring 75 is engaged by the rivet 57 as will be described in detail subsequently and is urged into engagement with the grounded contact 65 to complete an electrical circuit connection between the grounded case member 50 and the stud 66.

Figure 12:
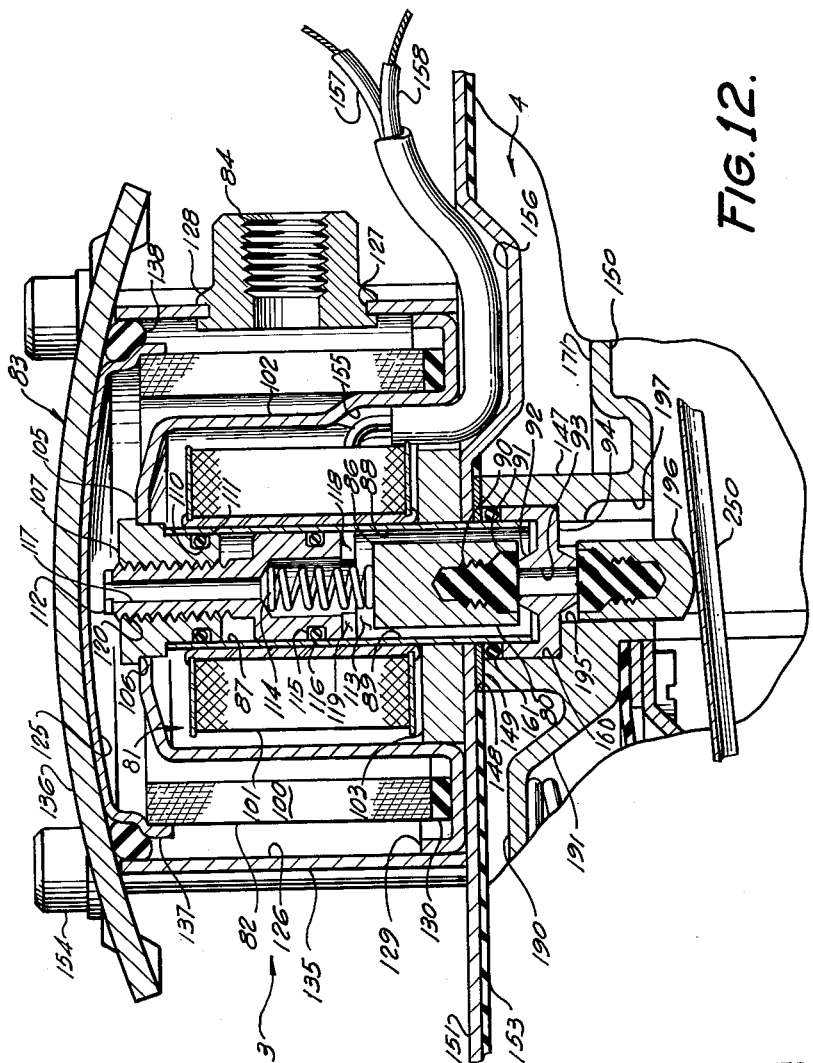
FIG. 12 is an enlarged view of the solenoid operated fuel on-off valve.

The fuel on-off valve assembly 3 (FIGS. 3 and 12) comprises a guided valve check 80, a solenoid assembly 81 for operating the valve check 80, a fuel filter 82, and a case assembly 83 enclosing the valve. A fuel inlet spud 84 on the case assembly connects the interior of the case assembly to a source (not shown) of propane maintained at a very high pressure.

The valve 80 is in effect the movable plunger of the solenoid assembly 81. The valve 80 comprises a generally cylindrical metallic bar 86 which is slidably received in a tubular nonmagnetic sleeve 87. Two diametrically opposed sides of the bar 86 have chordal sectors (FIG. 8) removed therefrom to provide fuel passageways 88 and 89 between the valve 80 and the sleeve 87. The lower end (FIG. 12) of the valve 80 comprises a partially threaded recess 90 which receives a resilient sealing element 91 therein. The element 91 is preferably a soft rubber material of approximately 50 durometer hardness.

The sealing element 91 in the closed position of the on-off valve assembly 3 seats upon a generally cup-shaped seating element 92. The element 92 includes a central aperture 93 in the center of an enlarged base 94. The seating element 92 is presented on the lower end of the sleeve 87.

The sleeve 87 is pressed into a coil form 100 which has an electrical coil 101 wound therearound. The form 100 is enclosed within an inverted, generally cup-shaped solenoid case 102 and a flat annular spacer 103. The upper base portion 105 of the case 102 includes a central aperture 106. An adaptor 107 is rigidly secured in the aperture 106, for example, by copper brazing. The adaptor 107 is snugly received in the sleeve 87 and includes an annular groove 110 receiving an O-ring 111 to provide a seal between the sleeve 87 and the adaptor 107.

The adaptor 107 includes a central threaded aperture 120 for receiving the upper threaded portion of an adjustable solenoid core 112. The core 112 adjusts the length of an air gap 113 between the core and the valve check 80 and also adjusts the biasing force against the plunger 80 produced by a spring 114. The core includes an annular groove 115 which receives a sealing O-ring 116 therein. The core includes a central passageway 117 and lower transverse passageways 118 and 119.

The passageways 88, 89, 117, 118 and 119 interconnect the valve passageway 93 with a chamber 125 defined by the solenoid case 102, the upper portion of the case assembly 83, and the filter 82. This chamber 125 is connected to an annular chamber 126 surrounding the filter 82 and connected with the fuel inlet spud 84.

The spud 84 is inserted through an aperture 127 in the case assembly 83 and is staked and copper brazed at 128. The filter 82 is annular and is received in a channel 129 defined by the lower end of the case 102. A flat annular gasket 130 is received between the channel 129 and the filter 82.

The case assembly 83 comprises an upright (FIG. 12) tubular wall section 135. A convex cover 136 is secured to the upper end of the wall section 135. The cover 136 has welded thereto an inverted generally cup-shaped spring member 137. An O-ring 138 produces a seal between the wall section 135, the cover 136, and the member 137. The lower end of the wall 135 is preferably secured to the channel 129 by copper brazing. The peripheral wall 139 of the spring 137 is received in telescoping relation over the upper end of the filter 82 and firmly engages the filter to force the gasket 130 into sealing relation with the channel 129.

The solenoid valve assembly 3 is carried by the combination regulator-heat exchange assembly 4. The assembly 4 comprises an irregularly shaped casting 150, which forms a housing for a primary fuel regulator and a heat exchanger, together with a sheet metal housing assembly 149 for a secondary fuel regulator. The casting 150 receives a sheet metal cover 151 which has its edges 152 rolled over the casting on all four sides for rigidity. A flat irregularly shaped gasket 153 is received between the upper surface of the casting 150 and the lower surface of the cover 151 to provide a seal. The cover 151 supports the solenoid valve assembly 3 in a central part thereof. Hence, the wall portion 135, the solenoid case 102, and the spacer 103 rest on the cover 151.

A flat annular spacer 149 is received in an aperture 148 in the gasket 153. The spacer 149 rests on an annular boss 147 on the casting 150.

Four equally spaced bolts 154 received through the cover 136 and threaded into the casting 150 clamp the cover and the O-ring 138 into tight engagement with the wall section 135 and clamp the wall section 135 into tight engagement with the cover 151. The cover 151 is thus forced against the gasket 153 until it engages the spacer 149. By means of this construction, the adjustment of the air gap 113 and the biasing pressure of spring 114 will not be affected by the gasket 153.

The solenoid case 102 is notched outwardly at 155 and the cover 151 is depressed at 156 to provide a space through which the coil winding terminals 157 and 158 are received. The valve seating element 92 is pressed into a counterbore 160 in the casting boss 147. An O-ring 161 provides a seal between the external periphery of the sleeve 87, the counterbore 160, and the spacer 149.

Figure 8:
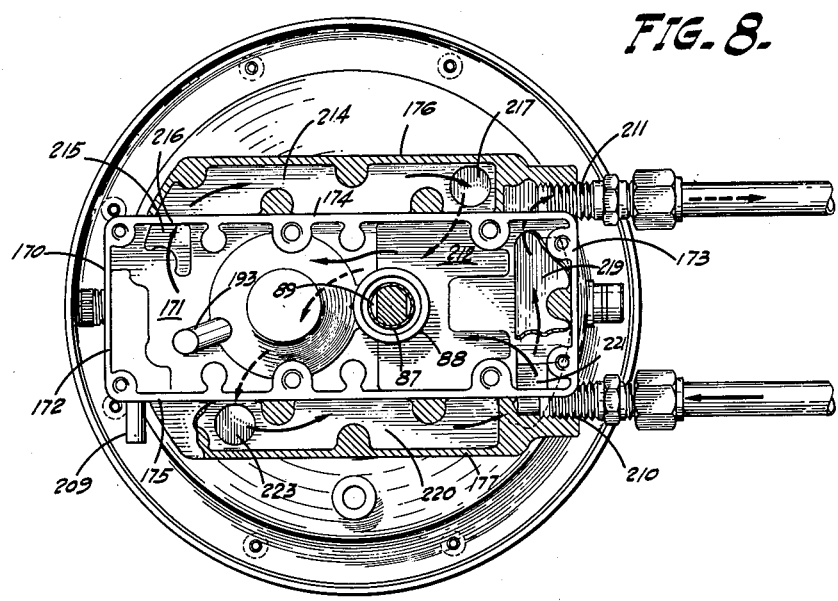
FIG. 8 is a plan view of the regulator assembly along line 8—8 of FIG. 3 except for the portions shown in section.
Figure 9:
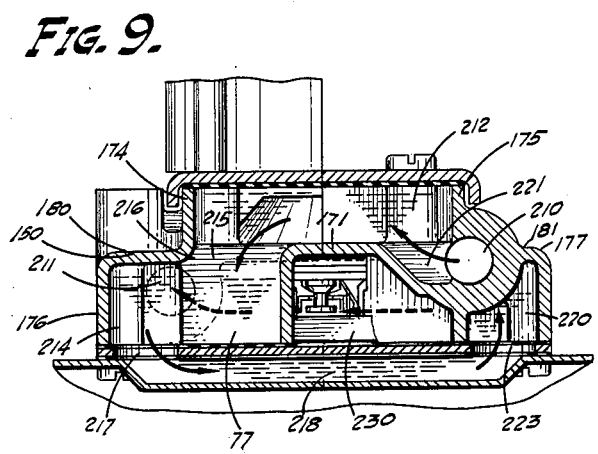
FIG. 9 is a side elevation section irregularly cut through the heat exchanger assembly at the various vertical water flow passageways for diagrammatically showing the flow pattern of the water used for heating the propane in conjunction with the horizontal flow path shown in FIG. 8.

The casting 150 will now be described in more detail. It comprises a generally rectangular main wall 170 (FIGS. 3, 8). The casting 150 is divided generally into an upper and lower portion with respect to FIG. 3 by a central wall 171. The wall 170 comprises a pair of end sections 172 (FIG. 8) and 173 and a pair of side sections 174 and 175. A pair of additional wall sections 176 and 177 are spaced outwardly from the side wall sections 174 and 175 respectively and are joined at their outer ends with the said sections 174 and 175. However, wall sections 176 and 177 extend upwardly from the lower edge of the casting 150 to approximately the level of the central dividing wall 171 as best shown in FIG. 9. The upper ends (FIG. 9) of the wall sections 176 and 177 are turned inwardly at 180 and 181 to join the wall sections 174 and 175 respectively. The various wall sections are irregularly shaped primarily for defining bosses with threaded bores in which various connecting bolts are received.

Figure 7:
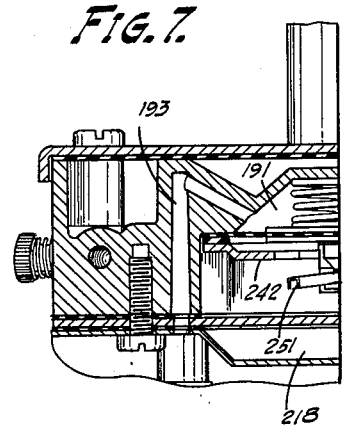
FIG. 7 is a partial sectional view along line 7—7 of FIG. 6 disclosing certain details of the primary regulator construction.
Figure 6:
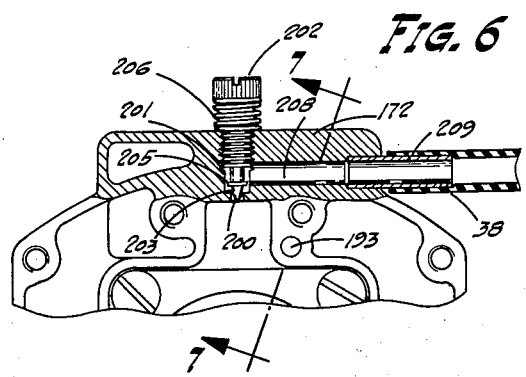
FIG. 6 is a partial sectional view showing certain details of the idle feed means.

The central wall 171 is recessed upwardly (FIG. 3) to define a truncated conical section 190 closed at its top to define a chamber 191 for a primary regulator 192. The central wall 171 is further recessed upwardly at 193 (FIGS. 7, 8) to provide a fluid connection to be described later to the chamber 191. The central wall 171 is also recessed upwardly to form the generally annular boss 147. The boss 147 defines the previously described bore 160 (FIG. 3) which receives the on-off valve seating element 92. The boss 147 also defines a central bore 195 which receives and guides a cylindrical primary valve element 196. The boss 147 is slotted at 197 at one edge of the bore 195 to provide a substantially unrestricted passageway for the flow of fuel around the valve element 196. The element 196 includes a rubber seating insert 198 similar to insert 91. The lower portion of the end wall 172 (FIG. 3) has been enlarged inwardly. A bore 200 (FIGS. 3, 6) and a counterbore 201 are defined by the enlarged section of wall 172. An idle fuel feed adjustment screw 202 is threaded into the counterbore 201. The screw includes a tapered tip 203 which is moveable longitudinally into the bore 200 to increase or decrease the effective cross-sectional area of the bore. A pin 204 is received in a transverse bore 207 in the enlarged wall section and is engageable with the screw 202 to support same. The pin 204 is also engageable with a flange 205 on the screw 202 adjacent its tip 203 for preventing the removal or loss of the screw 202. A spring 206 retains the screw 202 in its adjusted position. A transverse passageway 208 receives a stud 209. The stud 209 is connected to the carburetor passageway 22 by means of the hose 38 as described earlier.

The lower portion (FIG. 3) of the opposite end wall 173 is also enlarged to define water inlet and outlet bores 210 and 211 (FIG. 8). The inlet bore 210 is in fluid conducting relationship with the space 212 above (FIG. 3) the central wall 171 by way of an aperture 221 in the central wall and in wall 175. Passageway 214 (FIGS. 8, 9) defined by the walls 174 and 176 is connected in fluid conducting relationship with the space 212 by way of an aperture 215 in the wall 171 and an aperture 216 in the lower portion of the wall 174. This passageway 214 is also connected by way of the aperture 217 to a chamber 218 which will be described in more detail subsequently.

The outlet bore 211 is in fluid conducting relationship with the space 219 (FIGS. 3, 8) immediately adjacent the end wall section 173 and below the central wall 171. This space 219 is further defined by an additional inner wall 213 parallel to and spaced inwardly from the wall 173. The space 219 is connected in fluid conducting relationship with a passageway 220 defined by the walls 175 and 177. This connection is provided by an opening 222 (FIG. 12) between walls 175, 177, and 213. The passageway 220 is connected to the chamber 218 by way of aperture 223 (FIG. 9). Hence, the inlet 210 and the outlet 211 are interconnected by the passages described above.

Additional wall sections 225, 226, 227 and 228 (FIGS. 3, 10) projecting downwardly from the central wall 171 parallel to the end walls 172 and 173 define a generally rectangular chamber 229 immediately below the primary regulator chamber 191. The chamber 229 is a portion of the output chamber 230 of the primary regulator. A square resilient primary regulator diaphragm 240, a square gasket 241 and a square supporting plate 242 are suitably secured to the casting 150 below the chamber 191 in any suitable manner, for example by screws 231. The support plate 242 is depressed downwardly (FIG. 3) to prevent engagement with the movable portion of diaphgram 240.

The diaphragm assembly comprises a rivet 243, a pair of plates 244 carried by the diaphragm 240, and a generally U-shaped bracket 246 of a spring material. The rivet 243 and the bracket 246 projects through an opening 247 in the plate 242. T biasing spring 245 is held between the wall section 190 and the upper diaphragm plate. A diaphragm operated actuator arm 250 is slotted at its end 251 to receive the headed lower end 252 of the rivet 243. The other end of the arm 250 is pivotally carried on a pin 253 which pin is supported by a U-shaped bracket 254. The bracket 254 is snugly received between a pair of spaced bosses 255 and 256 (FIG. 10) which retain the pin 253 (FIG. 3) in place. The bracket 254 is suitably secured to a lower plate 260. The actuator arm 250 engages the primary valve element 196 to actuate same. The arm is received between the walls 227 and 228. The sides of the bracket 246 resiliently engage a pair of opposed depending projections 248 and 249 (FIG. 10) on the plate 242 to form a guide and centering means for the rivet and actuator arm.

The housing assembly 149 (FIG. 3) includes an inverted generally cup-shaped element 270 and a lower generally cup-shaped member 271. The members 270 and 271 include peripheral flanges 272 and 273 which are secured together by a plurality of circumferentially spaced screws 274. A secondary regulator assembly 280 includes a resilient disk-like diaphragm 281 which is supported at its outer peripheral edge between the flanges 272 and 273. The diaphragm 281 has affixed thereto a flat shallow cup 282 and a washer 283 by means of a rivet 284.

The secondary regulator 280 also comprises a tubular stud 290 which is curled and soldered to the upper base portion 291 of the housing member 270. The stud 290 defines a valve passageway 292 and a valve seat 293. A generally U-shaped bracket 296 is welded to the base 291 and supports a pivot pin 297 transverse to its sides. The central portion 300 of a valve lever 301 is pivotally carried by the pin 297. One end 302 of the lever 301 is slotted to receive a grooved section 303 of the rivet 284. The other end 306 includes a circular aperture (not shown) for receiving therethrough and supporting a resilient valve check 307.

The valve check 307 comprises a cylindrical upper section 308 which engages the seat 293 to provide a seal. The valve check 307 further comprises a tapered central section 309 and a lower reduced cylindrical section 310. The central portion of the tapered section 309 has an annular groove (not shown) which is snugly received in the lever end 306. The particular configuration of the valve check 307 with a very soft rubber material together with its connection with the valve lever 301 has been found to display a significant tendency to afford a very effective seal and metering. With a reasonably light baising force, no significant leakage thereby in the closed position of the valve is detectable.

The valve lever 301 includes a central upstanding projection 315 which receives a biasing spring 316. The biasing spring 316 is held between the base of the bracket 296 and the lever 301 and therefore urges the lever 301 in a clockwise direction with respect to FIG. 3. Thus the spring 316 urges the valve check 307 into its closed position on the valve seat 293. The diaphragm 281, when urged upwardly by a pressure differential on either side thereof, urges the valve lever 301 in a counter-clockwise direction with respect to FIG. 3 to open the valve.

The diaphragm 281 and the upper housing member 270 define the output chamber 320 of the secondary regulator 280. As will be described in detail later, the regulator 280 maintains the propane gas pressure in the chamber 320 at a pressure slightly (cg $\frac{1}{16}''$ water) below atmospheric pressure.

The diaphragm 281 and the lower housing member 271 define a chamber 321 which is maintained substantially at atmospheric pressure. It has been assumed that the carburetor reference pressure is atmospheric whereas the actual reference pressure will vary. As the air cleaner 10 becomes more and more clogged with dirt during use, the intake air pressure of the carburetor is reduced. This pressure differential must be compensated for by applying this reduced reference pressure to the chamber 321. This will cause the regulator output pressure in the chamber 320 to maintain the same differential pressure with respect to the carburetor intake pressure.

The lower housing member 271 has a stud 322 (FIG. 3). A hose 323 (FIG. 2) is secured to the stud 322 and also to the stud 42 on the carburetor body 7. Hence the air intake end 9 of the carburetor is connected in fluid conducting relationship with the secondary regulator chamber 321 (FIG. 3) by way of the stud 322, hose 323 (FIG. 2), stud 42, and the aperture 41.

The fuel regulator output chamber 320 is connected to the throat 32 of the carburetor venturi 31 by means of a tubular stud 325 (FIG. 4) which is rigidly secured to the upper base 291 of the housing member 270 by curling over the lower edge of the stud at 326 and soldering same to the base 291. The stud 325 defines a central passageway 327 for the fuel which passageway is reduced at its upper end to a desired cross-section to define the metering orifice 35. The upper end of the stud 325 is inserted into an aperture 330 in the carburetor body 7 when the regulator and solenoid valve assemblies are secured to the carburetor body 7. The stud 325 includes an external groove for receiving an O-ring 331 which provides a seal between the body 7 and the stud 325. The carburetor body 7 is secured to the solenoid assembly 3, and the regulator assembly 4 by two bolts 340 and 341 (FIGS. 1, 2).

The operation of the improved carbureting apparatus will now be described. When the engine is shut off, the vacuum switch 2 will maintain the circuit for the solenoid on-off coil 101 open. Accordingly, the on-off valve check 80 will be in its closed position on the seating element 92. The propane will be in liquid form at high pressure within the housing assembly 83. Hence, when the valve check 80 is opened, propane will immediately fill the primary regulator chamber 230 with no time delay. This will assure fast starting of the engine.

When the engine was previously stopped, it will have drained all of the propane from the secondary regulator chamber 320 and the primary regulator chamber 230. The primary regulator valve check 196 is in its lower open position since atmospheric pressure exists in the chamber 230. Since atmospheric pressure also exists in the secondary regulator chamber 320, the secondary regulator valve check 307 will be in its upper closed position on the seat 293.

The engine is started in a well known manner by means such as a starting motor. Engine manifold vacuum is applied to the carburetor passageway 22. As few as two cycles of engine operation have been found to completely scavenge the regulator chambers 230 and 320 of air. This has been made possible by applicants' unitary compact construction. The vacuum is also applied to the lower side of the diaphragm 53 of the vacuum switch 2. Atmospheric pressure on the upper side of the diaphragm will cause it to move downwardly to urge the spring 75 into engagement with the grounded contact 65 to energize the coil 101 of the on-off fuel valve. The coil 101 draws the on-off valve plunger 80 upwardly off the seating element 92. Liquid propane under high pressure surges through the valve passageway 93 into the primary regulatlaor chamber 230.

Due to the primary regulator chamber being at a very low pressure, the liquid propane will begin to vaporize. In vaporization, it requires the absorption of heat either from itself or from an external source. Consequently, the temperature of the propane drops rapidly, for example from ambient atmospheric temperature to temperatures of the order of minus 30 and 40 degrees Fahrenheit.

When the engine starts, a water pump (not shown) of the engine cooling system begins to operate. The pump forces the cooling system water, which may be at ambient atmospheric temperature or higher, from the inlet 210 through the heat exchange passages in the casting 150, to the outlet 211. Consequently, the propane also absorbs heat from the water. It will be appreciated that as the engine continues to run, the temperature of the water will be increased appreciably and that a great amount of heat transfer is achieved.

When the engine is started as described above to produce a vacuum in its manifold, combustion air will begin to flow through the air cleaner 10 and the carburetor passageway 22 to the manifold. Air flow through the venturi 31 will produce a subatmospheric pressure at the venturi throat 32 which subatmospheric pressure will be applied to the secondary regulator chamber 320. Atmospheric pressure (assuming there is no loss in the air cleaner 10) in the chamber 321 will urge the secondary regulator diaphragm 281 upwardly to lift the valve check 307 off the seat 293. Consequently, vaporized fuel will flow from the primary regulator chamber 230, through the passageway 292, the chamber 320, the metering orifice 35 (FIG. 4), the venturi aperture 32 (FIG. 2), and the carburetor passageway 22 to the engine manifold. In the passageway 22, the fuel is admixed with the combustion air.

The primary regulator 192 maintains a desired super-atmospheric pressure, for example 3 p.s.i. gage, in its chamber 230, urging the valve check 196 into engagement with the seating element 92 as long as said pressure is maintained in the chamber. This is accomplished by the primary valve diaphragm 240 which has the super-atmospheric pressure applied to the lower surface (FIG. 3) thereof while the force of the spring 245 and the substantially atmospheric output pressure of the secondary regulator 280 are applied to the upper surface of the diaphragm.

The secondary regulator 280 maintains the fuel pressure in chamber 320 approximately $\frac{1}{16}''$ water below atmospheric pressure so long as the cleaner 10 is clean. Even as the air cleaner 10 over a period of time begins to restrict the flow of air therethrough, a lower air pressure will be felt at the air intake end 9 of the carburetor 1. This lower pressure will be felt in the lower chamber 321 of the secondary regulator 280 and the regulator 280 will maintain a pressure in the chamber 320 which is the desired $\frac{1}{16}''$ water below the pressure in chamber 321.

Diaphragm travel in the secondary regulator is limited to as small a distance as possible, in the order of 6 to 10 degrees on either side of a normal relaxed diaphragm position. By making the effective area of the valve seat 293 sufficiently large, the valve check 307 need not be urged too far from its seat to permit sufficiently unrestricted flow at maximum power. The pivoted lever 301, which permits movement of the valve check equal to approximately one-third the movement of the diaphragm 281, interconnects the check and diaphragm. Maximum movement of the valve check from its closed position to its fully open position is preferably limited to approximately one-fourth the effective diameter of the valve check. Through the approximate 12–20 degree movement of the diaphragm, no appreciable stretching stress is applied to the diaphragm since for small angles the cosine is close to unit. This arrangement permits the use of an inexpensive low cost valve.

However, this construction at most only partially alleviates the regulator error. The spring 316 is held under differing degrees of compression at differing valve check open positions. It will be appreciated that the further the distance from the center of the spring to the pivot pin 297 of the lever 301, the greater the incremental change in the spring force applied to the lever for a given angular movement of the lever. Also, the further the spring center from the pivot, the greater the torque applied to the lever for any given force. The torque increment applied by the spring to the lever for a given angular movement of the lever is a function of the square of the distance between the pivot and the spring center.

Therefore, the biasing spring 316 has been located between the pivot pin 297 and the lever end 302, with the spring center being situated as close as possible to the pivot pin. In addition, the valve check 307 has been designed with sufficient resiliency and freedom of movement to assure reliable positive sealing at very light spring biasing pressures with minimum manufacturing tolerances.

By providing a large area resilient valve check, a short diaphragm stroke, a short valve check stroke relative to diaphragm stroke by means of a pivoted lever, and a biasing spring unusually close to the pivot point of the lever, it has been possible to provide an unusually sensitive secondary regulator which is very simplified and economical, which assures no detrimental leakage by the secondary valve, and which responds to unusually low pressure differentials in the order of $\frac{1}{16}''$ of water without resorting to prohibitively large or cumbersome diaphragm.

With this improved, highly sensitive secondary regulator 280, it is now possible to make use of a large substantially unrestricted venturi 31 in the carburetor 1 without encountering an unduly expensive construction. At the same time, this improved secondary regulator permits the use of an unusually simplified idle fuel feed means, described below, cooperating with the secondary regulator for supplying the desired amount of fuel when the engine is idling.

Also, no special means need be provided to achieve a sufficiently rich fuel-air mixture in the intermediate speed range of the engine or at high engine output power. As the engine speed progresses from idle into the intermediate speed range, the gradually increasing fuel supply from the secondary regulator blends with the idle fuel supply to provide an improved fuel-air mixture. As the speed increases further in the intermediate range, the subatmospheric pressure produced at the venturi throat is large enough to cause a sufficient fuel flow through the secondary regulator to operate the engine without the aid of the idle fuel supply, this latter supply becoming a relatively small proportion of the entire amount of fuel in the mixture.

In addition to the fuel supplied by the secondary regulator 280, fuel is also supplied from the primary regulator chamber 230 through the adjustable orifice 200, counterbore 201, transverse bore 208, stud 209, hose 38, and stud 37 into the passageway 22. When the engine is idling, this latter fuel supply will sufficiently enrich the fuel-air mixture to overcome engine pollution and to permit a smooth idling condition. Under these conditions, the air flow through the venturi 31 is low; however, there is still a sufficient subatmospheric pressure produced at the venturi throat to cause the small amount of fuel flow from the secondary regulator chamber 320 to the venturi.

Consequently, as the butterfly valve disk 21 is rotated to accelerate the engine, the fuel flow from the secondary regulator 280 will progressively increase with increasing air flow to assure a proper fuel to air ratio for the instantaneous engine power requirements without additional means. The increasing fuel flow from the secondary regulator 280 blends smoothly with the idle feed fuel supply throughout the power curve of the engine for optimum operation. It has been found that the stud 37 of the idle fuel feed connection may be positioned upstream of the butterfly valve disk 21. However, in this event, the setting of the adjusting screw 202 must be different.

It will be appreciated that a portion of the primary regulator chamber 230 will under almost all conditions include some propane which is liquefied and not yet vaporized. Accordingly, it is preferable that the regulator-heat exchanger assembly 4 (FIG. 3) be mounted with the water connections 210 and 211 in the lowermost position and the idle feed adjusting screw 202 in the uppermost position. This will inhibit splashing of liquid propane into the secondary regulator chamber 320. Such splashing would prevent the highly sensitive regulation desired in the regulator 280. In addition, baffle means are provided to assure the prevention of liquid propane in the secondary regulator. This baffle means includes the wall sections 227 and 228 (FIG. 10) in the casting 150. It also includes an elongated baffle plate 350 (FIG. 3) welded to plate 260 and parallel to walls 227, 228.

Although the baffle means in the primary regulator chamber 230 is adequate to prevent splashing of liquid propane into the chamber 320, it is nevertheless sufficiently nonrestricting to the flow of vaporized propane to permit its free rapid flow to the secondary regulator 280 at maximum engine power operating conditions. With a free unrestricted flow of vaporized propane, it will be apparent that the flow of vaporized propane from the primary regulator chamber to the secondary regulator chamber at maximum power output will be very rapid in relation to its flow at low output power. The capacity and the effective area of the heat exchanger have been designed to assure super-heating of the vaporized propane entering the secondary regulator to temperatures as high as 180° Fahrenheit at idle. Since the hot vaporized propane has a relatively low density, the fuel-to-air mass ratio will be relatively low at low engine speeds. The idle fuel supply will cause this mixture to be rich only at idle and for small power increases thereabove.

However, as the flow of vaporized propane increases in velocity with increasing engine output power, the temperature of the propane entering the secondary regulator chamber 320 progressively decreases because the capacity and effective transfer area of the heat exchanger are insufficient. Therefore, as the engine power output increases, the propane flow rate increases, the temperature of the propane decreases, and its density increases to provide a progressively richer mixture. This has been found to result in maximum engine efficiency and optimum engine operation.

Attention is directed at this time to the close proximity of the on-off fuel valve 80 and the primary regulator valve 196. In their closed positions, only the length of the passageway 93 separates them. This has been found to be very advantageous in the specific construction to permit a very rapid engine shutoff. The engine is normally shut off by turning the ignition key to break the circuit (not shown) of the coil 101. The valve check 80 seats immediately leaving only the primary and secondary regulator chambers 230 and 320 filled with fuel. Because of their relatively small volumes, because they are substantially nonrestricting to fuel flow, and because of the idle fuel feed system, the chambers are rapidly scavenged by the engine after which the engine stops due to the lack of fuel. It has been found that one or two cycles of engine operation can completely scavenge the regulator chambers.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. Carbureting apparatus for an internal combustion engine comprising an integral carburetor assembly including a body defining a passageway with an inlet and an outlet for combustion air, a venturi structure having a throat received in the passageway, and a valve in the passageway downstream of the venturi structure controlling the flow of air through the passageway; a primary regulator assembly including a first housing carried by the carburetor body and defining a first chamber, a member defining an inlet passageway to the chamber and a pair of spaced seating surfaces in the passageway, a valve check in the chamber moveable into engagement with one of the seating surfaces, a diaphragm means responsive to pressure in the chamber for operating the valve check to maintain a desired low pressure in the chamber, and an adjustably restricted passageway means connecting the chamber to the carburetor passageway; a valve and filter assembly including a second housing carried by the first housing and defining a second chamber, a fuel inlet spud on the second housing adapted for connecting the second chamber to an external source of hydrocarbon fuel maintained in liquid form under high pressure, a valve check of magnetic material in the housing engageable with the other seating surface in a position upstream from the one seating surface, a solenoid in the housing surrounding the magnetic valve check for urging it away from the other seating surface upon operation of the solenoid, a biasing spring urging the magnetic valve check into engagement with the other seating surface, passageway means connecting the second chamber with the space adjacent the other seating surface, and a filter in the second chamber for removing impurities from the liquid fuel; and a secondary regulator assembly including a third housing carried by the first housing and defining a third chamber, passageway means interconnecting the first and third chambers and having a seating surface, a valve check moveable into engagement with the latter seating surface, diaphragm means forming one wall of the secondary regulator chamber and responsive to the secondary regulator chamber pressure for operating the latter valve check to maintain a desired subatmospheric pressure in the third chamber, and a stud having a metering orifice connecting the third chamber and the venturi throat; at least the first housing including fluid passageways adapted for connection with an external source of fluid to raise the temperature of the vaporized fuel to progressively lower temperatures as the engine output power increases.

2. Carbureting apparatus for an internal combustion engine comprising an integral carburetor assembly including a body defining a passageway with an inlet and an outlet for combustion air, a venturi structure having a throat received in the passageway, and a valve in the passageway downstream of the venturi structure controlling the flow of air through the passageway; a primary regulator assembly including a first housing carried by the carburetor body and defining a first chamber, a member defining an inlet passageway to the chamber and a pair of spaced seating surfaces in the passageway, a valve check in the chamber moveable into engagement with one of the seating surfaces, a diaphragm means responsive to pressure in the chamber for operating the valve check to maintain a desired low pressure in the chamber, and an adjustably restricted passageway means connecting the chamber to the carburetor passageway; a second housing carried by the first housing and defining a second chamber, a fuel inlet spud on the second housing adapted for connecting the second chamber to an external source of hydrocarbon fuel maintained in liquid form under high pressure, a valve check of magnetic material in the housing engageable with the other seating surface in a position upstream from the one seating surface, a solenoid in the housing surrounding the magnetic valve check for urging it away from the other seating surface upon operation of the solenoid, a biasing spring urging the magnetic valve check into engagement with the other seating surface, and passageway means connecting the second chamber with the space adjacent the other seating surface; and a secondary regulator assembly including a third housing carried by the first housing and defining a third chamber, passageway means interconnecting the first and third chambers and having a seating surface, a valve check moveable into engagement with the latter seating surface, diaphragm means forming one wall of the secondary regulator chamber and responsive to the secondary regulator chamber pressure for operating the latter valve check to maintain a desired subatmospheric pressure in the third chamber, and a stud having a metering orifice connecting the third chamber and the venturi throat; at least the first housing including fluid passageways adapted for connection with an external source of fluid to raise the temperature of the vaporized fuel to progressively lower temperatures as the engine output power increases.

3. Carbureting apparatus for an internal combustion engine comprising an integral carburetor assembly including a body defining a passageway with an inlet and an outlet for combustion air, a venturi structure having a throat received in the passageway, and a valve in the passageway downstream of the venturi structure controlling the flow of air through the passageway; a primary regulator assembly including a first housing carried by the carburetor body and defining a first chamber, a member defining an inlet passageway to the chamber and a pair of spaced seating surfaces in the passageway, a valve check in the chamber moveable into engagement with one of the seating surfaces, a diaphragm means responsive to pressure in the chamber for operating the valve check to maintain a desired low pressure in the chamber, and a restricted passageway means connecting the chamber to the carburetor passageway; a second housing carried by the first housing and defining a second chamber, means for connecting the second chamber to an external source of hydrocarbon fuel maintained in liquid form under high pressure, a valve check of magnetic material in the housing engageable with the other seating surface in a position upstream from the one seating surface, a solenoid in the housing surrounding the magnetic valve check for urging it away from the other seating surface upon operation of the solenoid, a biasing spring urging the magnetic valve check into engagement with the other seating surface, and passageway means connecting the second chamber with the space adjacent the other seating surface; and a secondary regulator assembly including a third housing carried by the first housing and defining a third chamber, passageway means interconnecting the first and third chambers and having a seating surface, a valve check moveable into engagement with the latter seating surface, diaphragm means forming one wall of the secondary regulator chamber and responsive to the secondary regulator chamber pressure for operating the latter valve check to maintain a desired subatmospheric pressure in the third chamber, and a stud having a metering orifice connecting the third chamber and the venturi throat; at least the first housing including fluid passageways adapted for connection with an external source of fluid to raise the temperature of the vaporized fuel to progressively lower temperatures as the engine output power increases.

4. Carbureting apparatus for an internal combustion engine comprising an integral carburetor assembly including a body defining a passageway with an inlet and an outlet for combustion air, a venturi structure having a throat received in the passageway, and a valve in the passageway downstream of the venturi structure controlling the flow of air through the passageway; a primary regulator assembly including a first housing carried by the carburetor body and defining a first chamber, a member defining an inlet passageway to the chamber and a pair of spaced seating surfaces in the passageway, a valve check in the chamber moveable into engagement with one of the seating surfaces, a diaphragm means responsive to pressure in the chamber for operating the valve check to maintain a desired low pressure in the chamber, and a restricted passageway means connecting the chamber to the carburetor passageway; a second housing carried by the first housing and defining a second chamber, means for connecting the second chamber to an external source of hydrocarbon fuel maintained in liquid form under high pressure, a valve check in the housing engageable with the other seating surface in a position upstream from the one seating surface, means surrounding the valve check for urging it away from the other seating surface upon operation independent of the fuel pressure, a biasing spring urging the valve check into engagement with the other seating surface, and passageway means connecting the second chamber with the space adjacent the other seating surface; and a secondary regulator assembly including a third housing carried by the first housing and defining a third chamber, passageway means interconnecting the first and third chambers and having a seating surface, a valve check moveable into engagement with the latter seating surface, diaphragm means forming one wall of the secondary regulator chamber and responsive to the secondary regulator chamber pressure for operating the latter valve check to maintain a desired subatmospheric pressure in the third chamber, and metering orifice means connecting the third chamber and the venturi throat; at least the first housing including fluid passageways adapted for connection with an external source of fluid to raise the temperature of the vaporized fuel to progressively lower temperatures as the engine output power increases.

5. Carbureting apparatus for an internal combustion engine comprising an integral carburetor assembly including a body defining a passageway with an inlet and an outlet for combustion air, a venturi structure having a throat received in the passageway, and a valve in the passageway downstream of the venturi structure controlling the flow of air through the passageway; a primary regulator assembly including a first housing carried by the carburetor body and defining a first chamber, a member defining an inlet passageway to the chamber and a pair of spaced seating surfaces in the passageway, a valve check in the chamber moveable into engagement with one of the seating surfaces, a diaphragm means responsive to pressure in the chamber for operating the valve check to maintain a desired low pressure in the chamber, and restricted passageway means connecting the chamber to the carburetor passageway; a second housing carried by the first housing and defining a second chamber, means connecting the second chamber to an external source of hydrocarbon fuel maintained in liquid form under high pressure, a valve check in the housing engageable with the other seating surface in a position upstream from the one seating surface, means for urging it away from the other seating surface independently of the pressure of the fuel, and passageway means connecting the second chamber with the space adjacent the other seating surface; and a secondary regulator assembly including a third housing carried by the first housing and defining a third chamber, passageway means interconnecting the first and third chambers and having a seating surface, a valve check movable into engagement with the latter seating surface, diaphragm means forming one wall of the secondary regulator chamber and responsive to the secondary regulator chamber pressure for operating the latter valve check to maintain a desired subatmospheric pressure in the third chamber, and metering orifice means connecting the third chamber and the venturi throat; and at least the first housing including fluid passageways adapted for connection with an external source of fluid to heat the fuel to vaporize it.

6. Carbureting apparatus for an internal combustion engine comprising an integral carburetor assembly including a body defining a passageway with an inlet and an outlet for combustion air, a venturi structure having a throat received in the passageway, and a valve in the passageway downstream of the venturi structure controlling the flow of air through the passageway; a primary regulator assembly including a first housing carried by the carburetor body and defining a first chamber, a member defining an inlet passageway to the chamber and a pair of spaced seating surfaces in the passageway, a valve check in the chamber moveable into engagement with one of the seating surfaces, a diaphragm means responsive to pressure in the chamber for operating the valve check to maintain a desired low pressure in the chamber, and restricted passageway means connecting the chamber to the carburetor passageway; a second housing carried by the first housing and defining a second chamber, means connecting the second chamber to an external source of hydrocarbon fuel maintained in liquid form under high pressure, a valve check engageable with the other seating surface upstream from the one seating surface, a means for urging the valve check away from the other seating surface independently of the pressure of the fuel, and passageway means connecting the second chamber with the space adjacent the other seating surface; and a secondary regulator assembly including a third housing carried by the first housing and defining a third chamber, passageway means interconnecting the first and third chambers and having a seating surface, a valve check moveable into engagement with the latter seating surface, diaphragm means forming one wall of the secondary regulator chamber and responsive to the secondary regulator chamber pressure for operating the latter valve check to maintain a desired subatmospheric pressure in the third chamber, and metering orifice means connecting the third chamber and the venturi throat.

References Cited in the file of this patent
UNITED STATES PATENTS

| | | |
|---|---|---|
| 2,143,194 | Holzapfel | Jan. 10, 1939 |
| 2,248,222 | Ensign | July 8, 1941 |
| 2,587,165 | Jones | Feb. 26, 1952 |
| 2,745,727 | Holzapfel | May 15, 1956 |
| 2,775,981 | Zonker | Jan. 1, 1957 |
| 2,831,758 | Warner et al. | Apr. 22, 1958 |
| 2,894,829 | Harrison | July 14, 1959 |
| 2,962,366 | Oosterdijk | Nov. 29, 1960 |